United States Patent [19]
Gaetano

[11] Patent Number: 6,026,126
[45] Date of Patent: Feb. 15, 2000

[54] METHOD AND APPARATUS FOR REDUCING A RIPPLE SIGNAL IN AN OUTPUT OF A DIRECT CURRENT POWER SUPPLY

[75] Inventor: Mauro Luigi Gaetano, Wylie, Tex.

[73] Assignee: Motorola, Inc., Schaumburg, Ill.

[21] Appl. No.: 08/841,955

[22] Filed: Apr. 8, 1997

[51] Int. Cl.[7] .............................. H04K 1/02; H04L 25/03
[52] U.S. Cl. ................... 375/296; 363/46; 330/10
[58] Field of Search ..................... 375/238, 295, 375/297, 296; 330/207 A, 10; 363/44, 45, 46, 47, 39

[56] References Cited

U.S. PATENT DOCUMENTS

| | | |
|---|---|---|
| 4,344,126 | 8/1982 | Schumacher . |
| 4,667,279 | 5/1987 | Maier ......................................... 363/46 |
| 4,682,369 | 7/1987 | Schrader . |
| 4,727,874 | 3/1988 | Bowers et al. ............................. 606/38 |
| 5,237,492 | 8/1993 | King .......................................... 363/46 |
| 5,343,079 | 8/1994 | Mohan et al. ........................... 307/105 |
| 5,471,378 | 11/1995 | King .......................................... 363/46 |
| 5,559,467 | 9/1996 | Smedley .................................... 330/10 |

*Primary Examiner*—Don N. Vo
*Assistant Examiner*—Phuong Phu
*Attorney, Agent, or Firm*—R. Louis Breeden

[57] ABSTRACT

A method and apparatus reduces an output ripple signal of a power supply (200) for supplying a DC voltage and current to a load. One of the output ripple signal and an intermediate ripple signal is sensed to produce a control signal at a ripple sensing element (206), and a rectangular pulse carrier signal is generated by a pulse width modulator (302), the signal having a duty cycle modulated with the control signal to produce a pulse width modulated (PWM) signal carrying ripple signal energy. The rectangular pulse carrier signal operates at a frequency substantially higher than the control signal. The PWM signal is coupled into a portion of the power supply through a transformer (202). The transformer is arranged such that the PWM signal is combined with the intermediate ripple signal at an amplitude and relative phase sufficient to substantially reduce the output ripple signal.

20 Claims, 4 Drawing Sheets

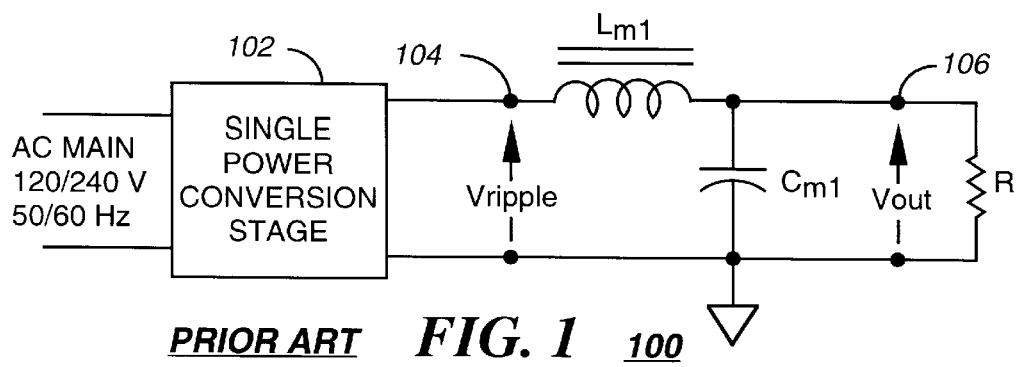
PRIOR ART *FIG. 1* 100
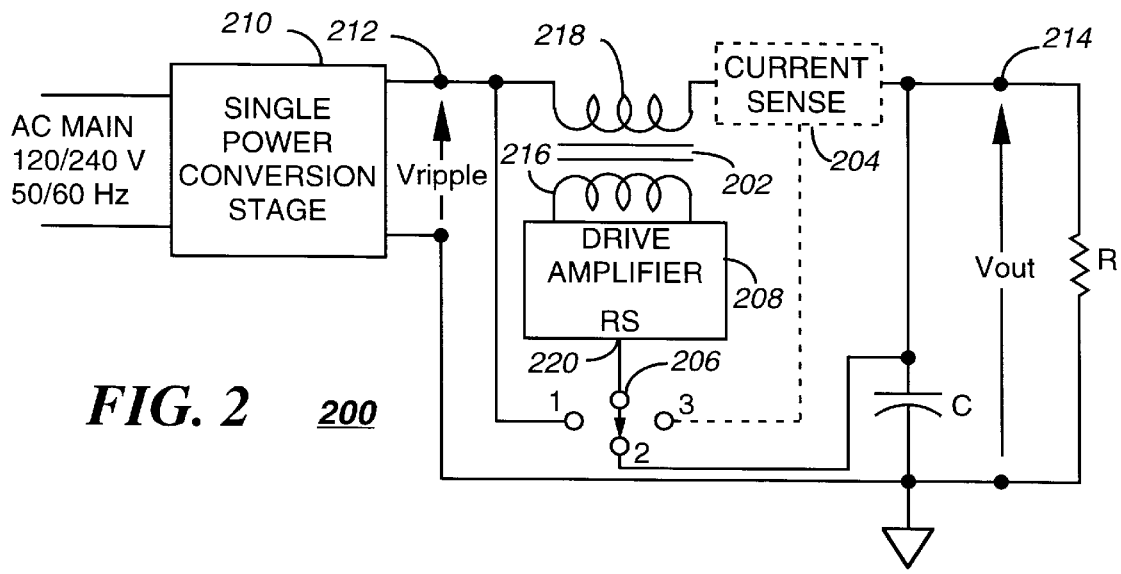
*FIG. 2* 200
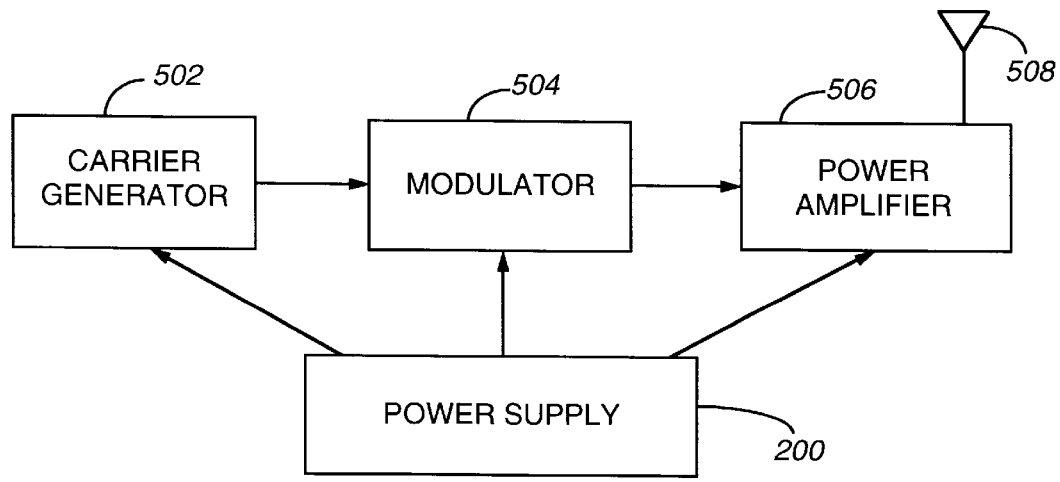
*FIG. 5* 500

300

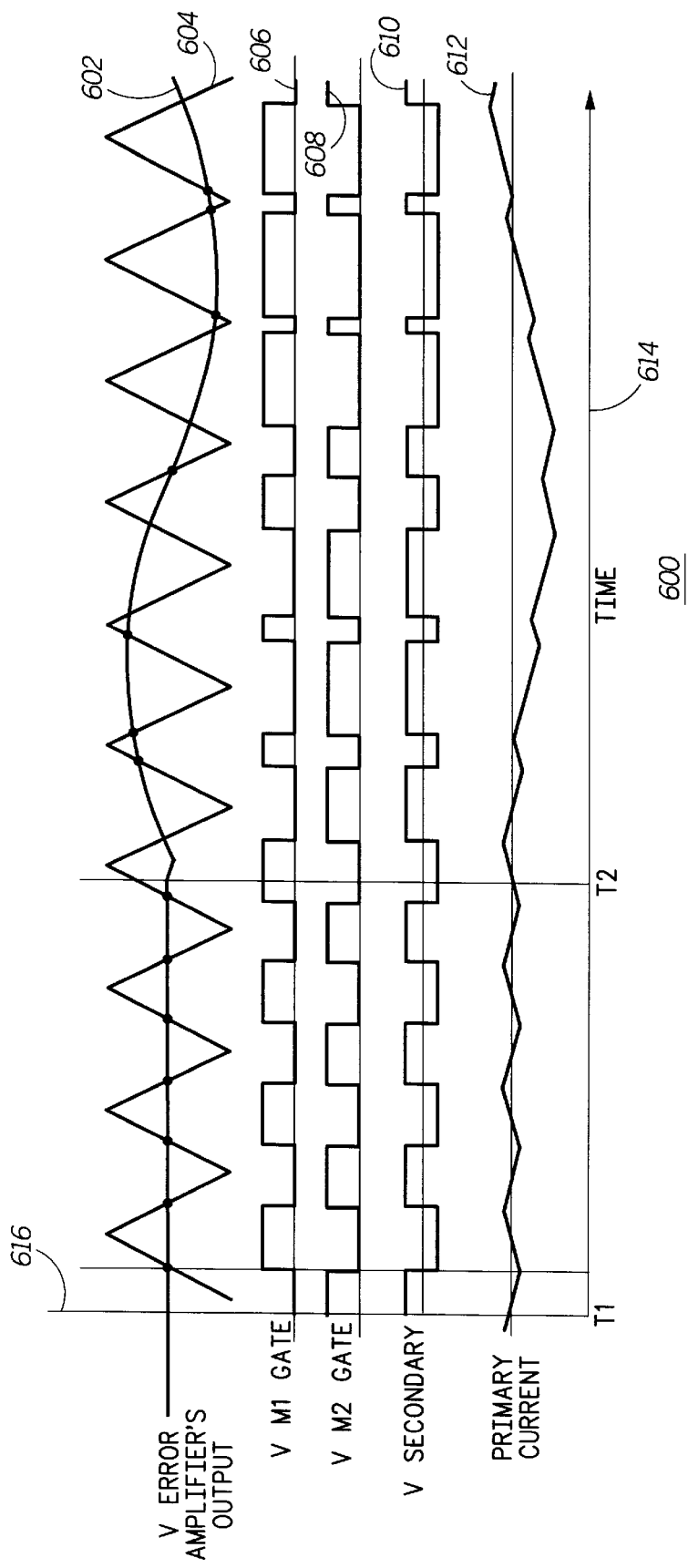

METHOD AND APPARATUS FOR REDUCING A RIPPLE SIGNAL IN AN OUTPUT OF A DIRECT CURRENT POWER SUPPLY

FIELD OF THE INVENTION

This invention relates in general to power supplies, and more specifically to a method and apparatus for reducing a ripple signal in an output of a direct current power supply.

BACKGROUND OF THE INVENTION

A class of direct current (DC) power supplies has considerable output ripple at double the line frequency. The ripple is usually attenuated by means of bulky passive L-C filters. A common power conversion topology associates a power factor correction (PFC) block and a pulse width modulation (PWM) block. The PFC block shapes the line current envelope to follow the line voltage, presenting an essential resistive load to the line. The PFC output current has, of necessity, a raised cosine envelope. The PFC output power pulsates at twice the line frequency and is smoothed by a storage capacitor at a relatively high voltage, typically 400 volts DC. The storage capacitor size is usually kept to a minimum at the expense of a relatively high ripple, e.g., 10 to 20 percent. The storage capacitor voltage is the source for the PWM converter block.

The PWM converter's switching frequency is much higher than the power line frequency; therefore the ripple is practically a static variation to the converter and can be easily removed by allotting a small fraction of the converter's PWM dynamic regulation range. The PWM converter loop gain tends to be high at the line ripple frequency, thus assuring a good ripple attenuation. The PWM converter output, after rectification, is still pulsating and requires filtering and energy storage, but at the higher frequencies utilized the energy storage demands are drastically reduced. The switching frequency filters are orders of magnitude smaller than equivalent line frequency filters.

The topology described above is referred to as a double conversion scheme. The first conversion (PFC) storage requirements are alleviated by the high voltage level and by the relaxed ripple requirements, since the ripple can be effectively eliminated by the second conversion. There are topologies which allow PFC, isolation, and voltage conversion at a high frequency with a single conversion block. The efficiency advantages are obvious, since losses are created at every conversion stage; however the PFC function, by nature, demands that the secondary power be delivered in pulsating form, at twice the line frequency. At lower secondary voltages, the storage capacitors necessary to bridge the energy delivery pulses quickly become impractically large when a low output ripple voltage is required.

Thus what is needed is a ripple reduction method and apparatus that can substantially reduce the energy stored in the ripple filter, thus achieving an appreciable size and cost reduction. Preferably, the ripple reduction method and apparatus will be applicable to a single conversion topology to further minimize size and cost.

SUMMARY OF THE INVENTION

An aspect of the present invention is a method for reducing an output ripple signal of a power supply for supplying a DC voltage and current to a load. The method comprises the steps of sensing one of the output ripple signal and an intermediate ripple signal to produce a control signal, and generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal. The method further comprises the step of coupling the PWM signal into a portion of the power supply through a transformer. The transformer is arranged such that the PWM signal is combined with the intermediate ripple signal at an amplitude and relative phase sufficient to substantially reduce the output ripple signal.

Another aspect of the present invention is a power supply for supplying a DC voltage and current to a load and for generating a reduced output ripple signal. The power supply comprises a ripple sensing element for sensing one of the output ripple signal and an intermediate ripple signal to produce a control signal, and a pulse width modulator coupled to the ripple sensing element for generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal. The power supply further comprises a transformer coupled to the pulse width modulator for coupling the PWM signal into a portion of the power supply. The transformer is arranged such that the PWM signal is combined with the intermediate ripple signal at an amplitude and relative phase sufficient to substantially reduce the output ripple signal.

Another aspect of the present invention is a radio communication transmitter. The transmitter comprises a carrier generator for generating a radio frequency carrier, and a modulator coupled to the carrier generator for modulating the radio frequency carrier to produce a modulated carrier. The transmitter further comprises a power amplifier coupled to the modulator for amplifying the modulated carrier; and a power supply coupled to at least one of the carrier generator, the modulator, and the power amplifier for supplying a DC voltage and current thereto, and for generating a reduced output ripple signal. The power supply comprises a ripple sensing element for sensing one of the output ripple signal and an intermediate ripple signal to produce a control signal, and a pulse width modulator coupled to the ripple sensing element for generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal. The power supply further comprises a transformer coupled to the pulse width modulator for coupling the PWM signal into a portion of the power supply. The transformer is arranged such that the PWM signal is combined with the intermediate ripple signal at an amplitude and relative phase sufficient to substantially reduce the output ripple signal.

BRIEF DESCRIPTION OF THE DRAWINGS

FIG. 1 is an electrical block diagram of a prior art power supply.

FIG. 2 is an electrical block diagram of a power supply in accordance with the present invention.

FIG. 5 is an electrical block diagram of a radio communication transmitter in accordance with the present invention.

FIG. 6 is a timing diagram that includes several waveforms which help describe the operation of the preferred embodiment in accordance with the present invention.

DETAILED DESCRIPTION OF THE DRAWINGS

Figure 3:
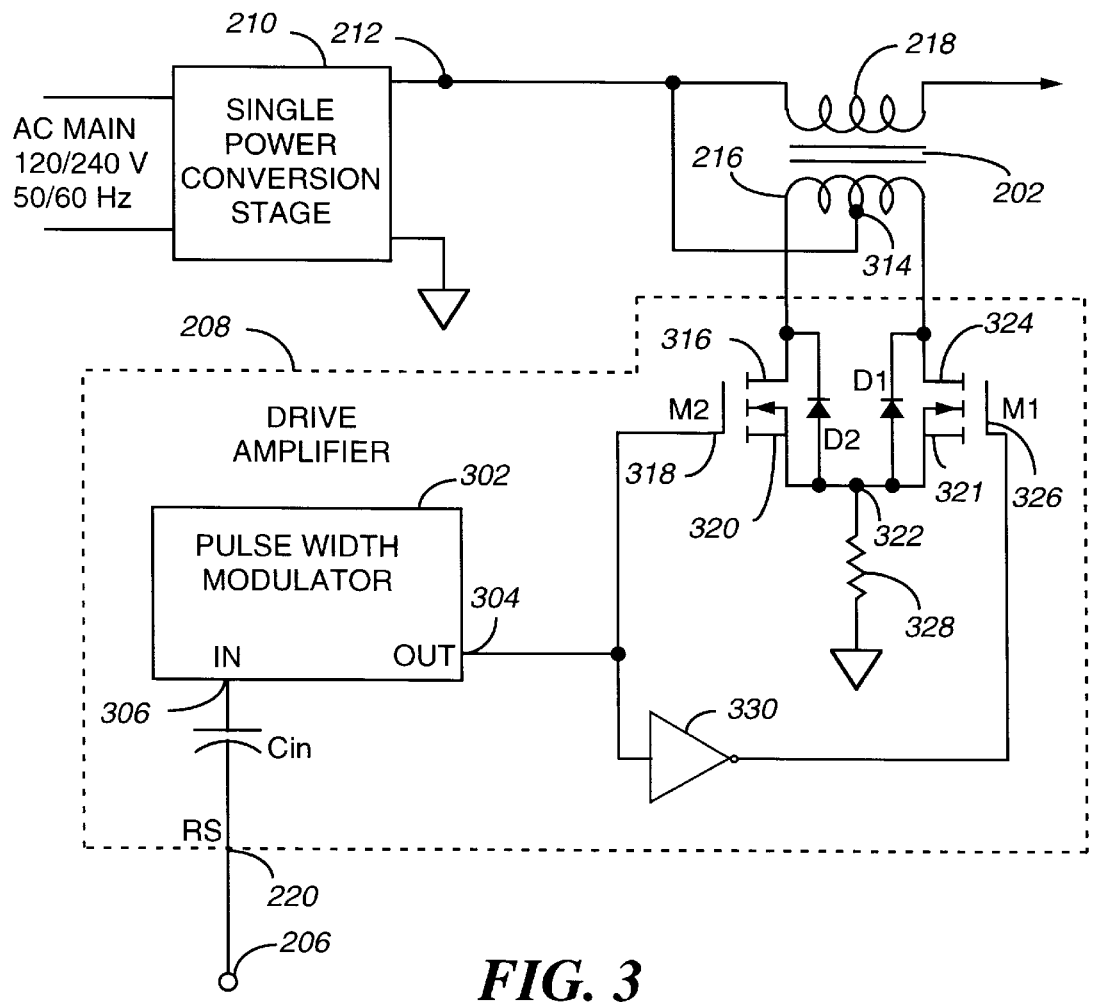
FIG. 3 is an electrical block diagram of a portion of the power supply in accordance with the present invention providing details of the preferred embodiment of a drive amplifier.

Referring to FIG. 1, an electrical block diagram depicts a prior art power supply 100 comprising a single power conversion stage 102, e.g., the well-known transformer and full bridge rectifier, a forward converter, a boost converter, or a flyback converter, to name a few. The single power conversion stage 102 produces at an intermediate node 104 a DC voltage superimposed with a ripple voltage which pulsates at twice the frequency of the AC main power. The prior art power supply 100 further comprises and inductor $L_{m1}$ and a capacitor $C_{m1}$ for filtering the ripple voltage to produce a clean DC voltage at an output node 106 for powering a load R. The LC filter will produce the desired ripple attenuation K.

$$K = \omega^2 LC - 1 \qquad \text{Eq.(1)}$$

Of the many L-C filters that satisfy Eq. (1), one solution minimizes the stored energy. Equations (2), (3), and (4) below give, respectively, the total energy stored in the filter and the values of inductance and capacitance that render the stored energy minimal.

$$W_{LC} = (P/\omega) \times \sqrt{K+1} \text{ Joules,} \qquad \text{Eq. (2)}$$

where P is the DC power traversing the filter ($V_{out} \times I_{load}$).

Half the energy is stored within the minimum energy inductor $$L_{mI} = (R/\omega) \times \sqrt{K+1}. \qquad \text{Eq. (3)}$$

The other half of the energy is stored within the minimum energy capacitor $$C_{mI} = \frac{1}{\omega R} \times \sqrt{K+1}. \qquad \text{Eq. (4)}$$

As expected, equation (2) shows that the minimum energy stored within the filter, and consequently the size of the filter, is proportional to the DC power traversing the filter and to the square root of the required attenuation, and inversely proportional to the signal frequency. In all calculations the pulsation is at a ripple frequency which is twice the line frequency f, that is, $$\omega = 4\pi f. \qquad \text{Eq.(5)}$$

Alternatively, a linear regulator with minimal voltage drop could be a solution at low power levels, but is not practical at higher power. The combined effects of DC loss and bias to accommodate a large input ripple may easily exact a 5% efficiency penalty. With such a penalty, a double conversion power supply may be a better solution. Another alternative is to use a high efficiency buck converter, which can easily regulate the ripple. In this case the conversion is at the secondary after the main rectification, a double conversion scheme nevertheless. The traditional solutions listed have a common drawback: all of the output power is handled by the filter circuit.

Referring to FIG. 2, an electrical block diagram depicts a power supply 200 in accordance with the present invention comprising a conventional single power conversion stage 210 filtered by a large capacitor (not shown), which produces at an intermediate node 212 a DC voltage superimposed with a ripple voltage which pulsates at twice the frequency of the AC main power. The power supply 200 further comprises a transformer 202 having a secondary winding 218 coupled between the intermediate node 212 and an output node 214. The primary winding 216 is coupled to a drive amplifier 208 for developing a signal in the secondary winding 218 which substantially cancels the ripple voltage to produce a clean DC voltage at the output node 214, as described further below. A ripple sense input 220 of the drive amplifier 208 is coupled to a ripple sensing element 206, which is depicted as a three-position switch selecting one of three ripple sensing modes.

Preferably, the ripple sensing element 206 is coupled (position 2) to the output node 214 in parallel with a small capacitor C (for filtering a high frequency carrier signal, as will be explained herein below) and operates in a feedback mode. The feedback mode advantageously does not require that the gain of the drive amplifier 208 be controlled with great accuracy, because the feedback mode operates to null the ripple voltage in a self-adjusting manner. The feedback mode can, however, exhibit instability under some load conditions, e.g., highly reactive loads. Alternatively, the ripple sensing element 206 can be coupled (position 1) to the intermediate node 212 and can operate in a feed-forward mode. The feed-forward mode is advantageously stable for all load conditions. Unfortunately the feed-forward mode requires precision control of the gain of the drive amplifier to generate an exact replica of the ripple voltage to cancel the same. Another alternative (position 3) is for the ripple sensing element 206 to be coupled to a current sensing element 204 which is coupled between the secondary winding 218 of the transformer 202 and the output node 214. The current sensing element 204 can comprise, for example, a small resistor for generating a sense signal proportional to the output current. A conventional differential amplifier is AC coupled to the sense signal using well-known techniques to amplify the sense signal to a sufficient level for use by the ripple sense input 220 of the drive amplifier 208. This current sensing mode is advantageous for reducing not only the ripple voltage present at the intermediate node 212 but also for reducing additional ripple that can be generated at the output node by a changing load. In other words, the current sensing mode advantageously tends to keep the output current at a constant level, regardless of the source of the ripple.

By way of example, let's assume for the moment that the transformer 202 has a 1:1 turn ratio, and that an "ideal voltage source" capable of delivering a copy of the ripple voltage $V_r$ is available and connected to the transformer primary 216. Assuming the phasing is correct it is clear how the voltage of the transformer secondary 218 can be made to buck the ripple voltage at the intermediate node 212, canceling it and delivering to the load R a perfect DC. The transformer 202 is practically working "open circuit" because no ripple current is flowing through it or the load.

For typical telecommunication application requirements with respect to noise and power level, an optimized ripple cancellation design is smaller, lighter, and less expensive than a comparable passive filtering solution. The preceding statement is true even considering the added complexity and cost of building the drive amplifier 208 for the primary winding 216 of the transformer 202. The following paragraph will illustrate the dimensioning of the ripple cancellation components in accordance with the present invention.

The energy handling ability of the transformer 202 is controlled by two contrasting requirements. Secondary inductance should be low to reduce the stored energy associated with the DC field. On the other hand, the primary inductance should be high to minimize the magnetizing current that must be supplied by the drive amplifier 208. A compromise is required, because the two inductance values are nearly identical. Varying the turn ratio will change the impedance exhibited by the transformer 202 but has no effect on the energy stored.

The secondary of the transformer 202 will store a steady field energy equal to $$W_{SEC} = \frac{1}{2}LI^2 \text{ Joules.} \qquad \text{Eq. (6)}$$

The primary of the transformer 202 must be capable of handling a reactive power equal to $$W_{PRI} = (V_{ripple})^2/\omega L \text{ VAR} \qquad \text{Eq.(7)}$$

Integrating the reactive power over the period yields the primary drive energy. The combined primary and secondary energy is lowest for a value of inductance equal to $$L_{m2} = 2\varepsilon\sqrt{\pi} \times \frac{R}{\omega} \text{ where } \varepsilon = \frac{V_r}{V_{out}} \ll 1. \qquad \text{Eq. (8)}$$

The minimum energy stored in the optimal inductance $L_{m2}$, under the conditions above is $$W_{SEC} = \varepsilon\sqrt{\pi} \times \frac{P}{\omega}. \qquad \text{Eq. (9)}$$

Equation (2), governing the prior art passive filter solution, indicates that stored energy, and consequently component dimensions, are proportional to the DC power and proportional to the square root of the attenuation desired. Equation (9), governing the cancellation technique in accordance with the present invention, indicates that stored energy, and consequently component dimensions, are proportional to the product $V_{out} \times V_{ripple}$, which implies a power level much smaller than the DC power. Furthermore, the component dimensions are independent of the attenuation requirements.

While the cancellation approach has no theoretical limit to ripple reduction, it is practical to achieve 20–30 dB, which is the typical performance of passive L-C filters. For typical values of K=10 and $\varepsilon$=0.1 the inductor of the prior art approach stores 9 times the energy as compared with the cancellation approach in accordance with the present invention, thus the prior art inductor's volume is likely to be 9 times as large. Also, with the cancellation approach of the present invention the filter capacitor $C_{m1}$ is replaced by the small capacitor C, typically about one-tenth the size of $C_{m1}$.

There is no line frequency ripple current in the transformer secondary 218 because the net ripple EMF in the load loop comprising the power conversion stage 210, the transformer secondary 218, and the load R is zero. The drive amplifier 208 must supply only the primary magnetizing current $$I_m = \frac{V_r}{\omega L}. \qquad \text{Eq. (10)}$$

Combining Eq.(7) and Eq.(8) we calculate the primary drive reactive power to be $$W_{PRI} = \frac{\varepsilon P}{2\sqrt{\pi}} = \frac{(V_r)^2}{\omega L_{m2}}. \qquad \text{Eq. (11)}$$

Even with a large ripple, such as $\varepsilon$=0.1, the primary drive of the transformer 202 requires less than 3% of the output power. A linear amplifier, however, is not practical to drive the primary 216, since 3% of the output power is still significant.

Referring to FIG. 3, an electrical block diagram 300 depicts a portion of the power supply 200 in accordance with the present invention providing details of the preferred embodiment of the drive amplifier 208. Since all that is necessary is reactive power we can use a switch mode regulator, running at many times the line frequency. A rectangular pulse carrier at, for example, 20 kHz and amplitude about $2 \times V_r$ is applied to the primary 216 of the transformer 202. In the absence of modulation the carrier is a square wave having zero average amplitude. Under this condition, the voltage at the secondary 218 of the transformer 202 has no spectral components other than those associated with the square wave carrier. By modulating the carrier's duty cycle with the ripple voltage, the modulated carrier assumes an alternating average value within the ripple semi-period. Of course, the long term average voltage across the primary 216 of the transformer 202 will always be zero.

The transformer flux is equally split between a DC flux component due to the secondary DC current and a peak ripple component due to the ripple cancellation voltage. The flux at the carrier frequency is minimal, because the carrier voltage is comparable to the ripple voltage yet is at a much higher frequency. If we observe the ripple spectrum at the load R, we find that the modulated carrier spectrum has replaced the low frequency ripple. We are now faced with the simpler task of filtering out the high frequency carrier ripple.

The drive amplifier 208 comprises a conventional pulse width modulator 302 having an input 306, which is AC coupled through a capacitor Cin, which forms the ripple sense input 220, to the ripple sensing element 206 of the power supply 200. The pulse width modulator 302 is preferably similar to the MC34023P integrated circuit controller manufactured by Motorola, Inc. of Schaumburg IL. It will be appreciated that other similar controllers, or discrete components, can be utilized as well to construct the pulse width modulator 302.

The output 304 of the pulse width modulator 302 is coupled to the gate 318 of an electronic switch M2, and further coupled to the input of an inverter 330. The output of the inverter 330 is coupled to the gate 326 of an electronic switch M1. Preferably, the electronic switches M1, M2 are similar to the MTP15N06VL MOSFET switch manufactured by Motorola, Inc. It will be appreciated that other similar electronic switches can be utilized for the electronic switches M1, M2 as well. The drains 324, 316 of the electronic switches M1, M2 are coupled to opposite ends of the primary 216 of the transformer 202. The sources 321, 320 of the electronic switches M1, M2 are coupled to a first node 322. The first node 322 is coupled through a resistor 328 to ground. Bulk body diodes D1, D2 are shown across the electronic switches M1, M2 from source to drain, the anodes of the diodes D1, D2 being coupled to the sources 321, 320. The diodes D1, D2 are internal and integral to the electronic switches M1, M2, and are shown in FIG. 3 because they play an active role in the preferred embodiment. The primary 216 has a center tap 314, which is coupled to the intermediate node 212 for receiving power therefrom.

The transformer 202 is preferably a line frequency transformer with gapped core to handle the DC bias. With minimal effort a significant leakage inductance can be introduced to provide one of the high frequency filter elements for removing the high frequency carrier ripple. Since the capacitor C is in parallel with the load R, at the carrier frequency the secondary 218 is working shorted between two large capacitors, on its own leakage inductance. On the other hand, the secondary 218 appears open at the line frequency ripple (because of the cancellation).

From the primary side the leakage inductance and the magnetizing inductance are seen in parallel at the carrier frequency. By designing the injection transformer with a leakage inductance of about 10%, it will still have a sufficiently high impedance at carrier frequency to be a negligible load for the drive amplifier 208. Since the DC output voltage V is available to power the drive amplifier 208, it is advantageous to step up the primary impedance level by choosing a turn ratio close to $$N = \frac{V}{2 \times V_r}. \qquad \text{Eq. (12)}$$

At first glance the circuit of FIG. 3 appears similar to a conventional PWM converter, but there is a difference. In a conventional PWM converter the two power MOSFETs would be driven with identical duty cycles, they both conduct, alternately, for the same fraction of the carrier semi-period. The secondary voltage, averaged over any integer number of carrier frequency periods, is always zero. The duty cycle modulation changes the duration of symmetrical bipolar pulses available at the secondary. The secondary voltage spectrum contains the carrier and its harmonics, and each spectral line is amplitude modulated by the signal driving the duty cycle.

In the drive amplifier 208 the two electronic switches M1, M2 are driven with complementary duty cycles. When one switch is conducting for more than 50% of the carrier period, the other switch is conducing for a corresponding shorter time. If we define the neutral position as a 50% duty cycle, whereby each switch M1, M2 conducts for half the carrier period, we obtain a square wave at the secondary 218. Only under this condition, is the secondary voltage, averaged over any integer number of carrier frequency periods, zero. As the ripple signal modulates the duty cycle in one direction, the secondary voltage positive pulses become longer and the negative pulses become shorter. This situation must be reversed cyclically to maintain a zero secondary DC voltage. The short term secondary voltage, however, averaged over the ripple semi-period is not zero, but actually follows the ripple amplitude. The spectrum of the transformer secondary voltage contains low frequency lines representative of the ripple voltage spectrum, thus the ripple signal can be reconstructed by integrating the secondary voltage. Since the carrier signal superimposed on the ripple signal is at high frequency it can be easily filtered.

Except for the MOSFET switching losses, diode D1, D2 losses, and the transformer losses, the circuit switches entirely reactive power, since the drive amplifier load is essentially the primary inductance of the transformer 202 in parallel with the leakage inductance. When the ripple voltage is not near zero, the primary current is unidirectional and circulates through one pair of devices only, either M1 and D2 or M2 and D1. The switches M1, M2 charge the inductance, delivering positive Volt × Seconds consuming current from the intermediate node 212. Then at the end of the M1 or M2 conduction, the inductance dumps the energy accumulated back into the intermediate node 212 by transferring the current to the other half of the primary winding 216 via the opposite diode D2 or D1, respectively. When the ripple voltage is near zero, the primary current reverses every cycle; all four devices conduct in turn following the sequence M1, D2, M2, D1, M1, D2 . . . .

The turn ratio of the transformer 202 is designed to create an open circuit carrier voltage at an amplitude slightly greater than the worst case ripple peak voltage. While the line frequency ripple is canceled, the carrier would be present at the load terminal unless filtered out, preferably by a low-pass filter. The carrier frequency choice must strike a compromise between ease of filtering and limiting the switching losses. Present technology suggests a frequency between 20 kHz and 100 kHz. The transformer 202 can be designed with high leakage inductance, thereby providing one of the carrier filter elements practically for free. The carrier filter capacitor C can be placed directly across the secondary winding, but if an electrolytic is required, then it should be placed as in FIG. 2, to guarantee a bias voltage.

The need for additional high frequency filtering seems to reduce the ripple cancellation advantages over conventional filtering; however, it is important to point out that for typical telecommunication equipment the output of a single conversion rectifier needs high frequency filtering regardless of the adoption of ripple cancellation techniques. The rectified current available at the secondary of a single conversion power supply follows the $\sin^2(\omega_{line}t)$ envelope, but the instantaneous current still contains the switching frequency harmonics. The capacitor utilized in the single power conversion stage 210 is a large electrolytic, not very effective at high frequency. If the ripple requirements are stringent, as in typical telecommunication equipment, high frequency filtering is required anyway.

Figure 4:
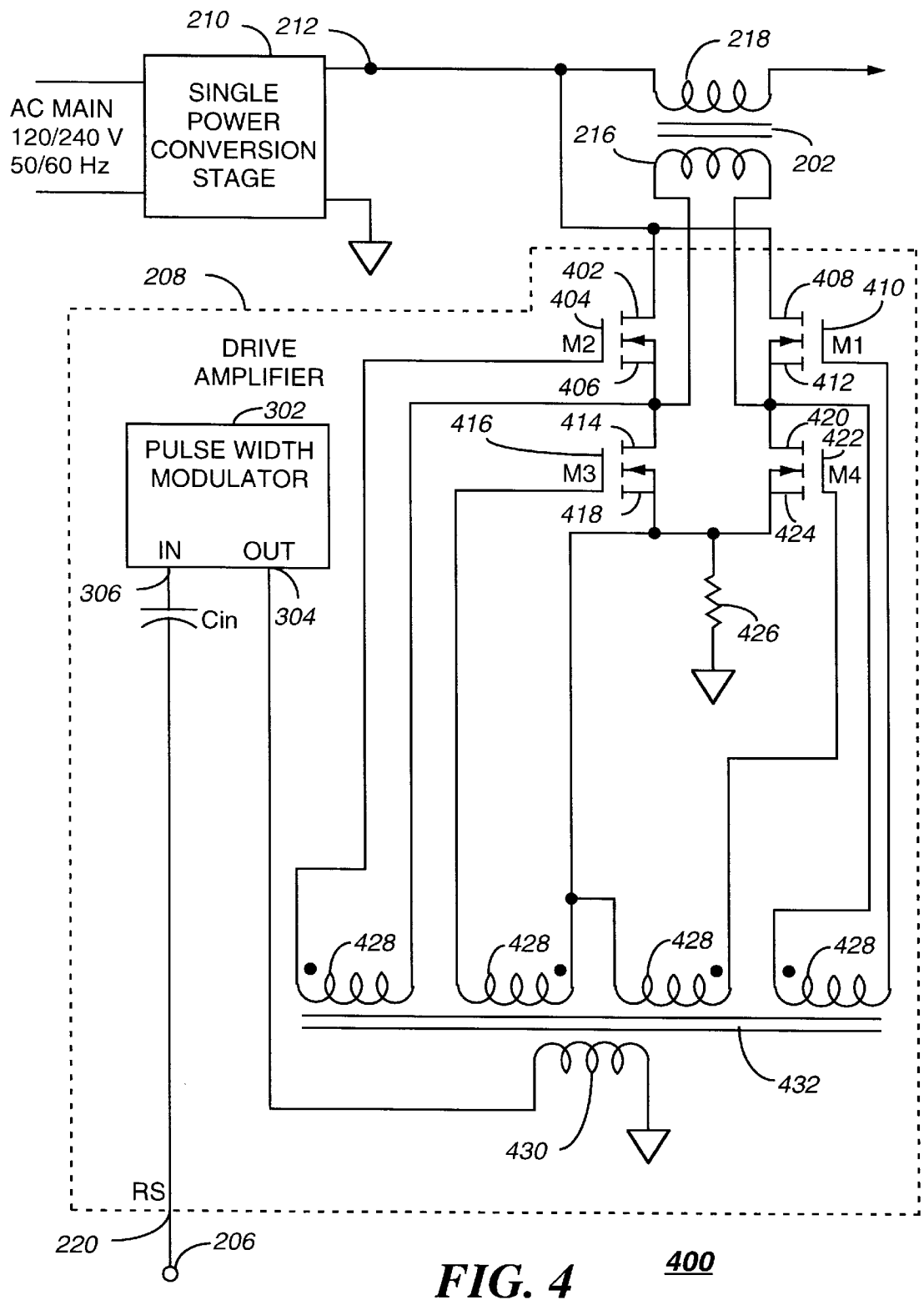
FIG. 4 is an electrical block diagram of a portion of the power supply in accordance with the present invention providing details of an alternative embodiment of the drive amplifier.

Referring to FIG. 4, an electrical block diagram 400 depicts a portion of the power supply 200 in accordance with the present invention providing details of an alternative embodiment of the drive amplifier 208. The diagram 400 is similar to the diagram 300, the essential difference being that the drive amplifier 208 utilizes a full-bridge switching amplifier (M1, M2, M3, M4) for driving the primary 216 instead of the push-pull switching amplifier depicted in the diagram 300. In addition, because of offset voltages present in the full-bridge amplifier, a PWM drive transformer 432 is used for driving the gates of the electronic switches M1–M4. The output 304 of the pulse width modulator 302 is coupled to one end of the primary 430 of the PWM drive transformer. The other end of the primary 430 is coupled to ground. Four secondaries 428 of the PWM drive transformer are coupled between the gate 410, 404, 416, 422 and source 412, 406, 418, 424 of the electronic switches M1, M2, M3, M4, respectively. The drains 408, 402 of the electronic switches M1, M2 are coupled to the intermediate node 212 for receiving power therefrom. The sources 412, 406 of the electronic switches M1, M2 are coupled to the drains 420, 414 of the electronic switches M4, M3. The sources 418, 424 of the electronic switches M3, M4 are coupled through a resistor 426 to ground. The primary 216 of the transformer 202 is coupled to the center of the full-bridge amplifier at a node connecting the sources 406, 412 to the drains 414, 420. No center tap is required in the transformer 202 for this alternative embodiment. Polarities of the connections of the secondaries 428 of the PWM drive transformer are arranged such that M1 and M3 conduct simultaneously, while M2 and M4 are off; and M2 and M4 conduct simultaneously, while M1 and M3 are off. While M1 and M3 conduct, the DC voltage from the intermediate node 212 is applied with one polarity to the primary 216 of the transformer 202. When M2 and M4 conduct, the DC voltage is applied with the opposite polarity. The circuit of the diagram 400 operates to produce a ripple canceling result similar to that described herein above for the circuit of the diagram 300.

Referring to FIG. 5, an electrical block diagram depicts a radio communication transmitter 500 in accordance with the present invention comprising a conventional carrier generator 502 for generating a radio frequency carrier, and a conventional modulator 504 coupled to the carrier generator 502 for modulating the radio frequency carrier to produce a modulated carrier. The radio communication transmitter 500 further comprises a conventional power amplifier 506 coupled to the modulator 504 for amplifying the modulated carrier; and the power supply 200 coupled to the carrier generator 502, the modulator 504, and the power amplifier 506 for supplying a DC voltage and current thereto, and for generating a reduced output ripple signal. The radio communication transmitter 500 also includes an antenna 508 coupled to the power amplifier 506 for radiating the radio signal.

FIG. 6 is a timing diagram 600 that includes several waveforms which help describe the operation of the preferred embodiment in accordance with the present invention, as depicted in the diagram 300. In the timing diagram 600 the horizontal axis 614 represents time, while the vertical axis 616 represents amplitude. The amplified ripple voltage present at an error amplifier's output (internal to the pulse width modulator 302 ) is depicted in the waveform 602. Between times T1 and T2 the waveform 602 is representative of zero ripple voltage. After time T2 the waveform 602 is representative of a large ripple voltage. The triangular waveform 604 represents a signal present at a PWM comparator, also internal to the pulse width modulator 302. The interaction between the amplified ripple voltage and the triangular waveform generates the output signal of the pulse width modulator 302, which is the non-inverted waveform 608 at the gate of M2. The inverted waveform 606 is the output signal of the pulse width modulator 302 after inversion by the inverter 330. The waveform 610 depicts the voltage at the secondary 218 of the transformer 202, containing the modulated ripple components. The waveform 612 depicts the current in the primary 216 of the transformer 202.

Thus, it should be clear from the foregoing disclosure that the present invention provides a power supply ripple reduction method and apparatus that can substantially reduce the energy stored in the ripple filter, thus achieving an appreciable size and cost reduction. The method and apparatus advantageously is applicable to a single conversion topology to achieve a power supply of minimum size and cost.

While the foregoing has disclosed by way of example several embodiments in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method for reducing an output ripple signal of a power supply for supplying a direct current (DC) voltage and current to a load, the method comprising step of:
    sensing one of the output ripple signal and an intermediate ripple signal to produce a control signal;
    generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal; and
    coupling the PWM signal into a portion of the power supply through a transformer, the transformer arranged such that the PWM signal is combined with the intermediate ripple signal at an amplitude and relative phase sufficient to substantially reduce the output ripple signal.

2. The method of claim 1, wherein the sensing step comprises a step of sensing a ripple voltage across the load.

3. The method of claim 1, wherein the sensing step comprises a step of sensing a ripple voltage at a source of the intermediate ripple signal.

4. The method of claim 1, wherein the sensing step comprises a step of sensing a signal proportional to a ripple current through the load.

5. The method of claim 1, further comprising a step of low-pass filtering an output of the power supply to suppress the rectangular pulse carrier signal.

6. The method of claim 1, wherein the coupling step comprises a step of amplifying the PWM signal with a push-pull switching amplifier coupled to opposing halves of a center-tapped primary winding of the transformer.

7. The method of claim 1, wherein the coupling step comprises a step of amplifying the PWM signal with a full-bridge switching amplifier having a primary winding of the transformer coupled thereto.

8. The method of claim 1, wherein the coupling step comprises a step of coupling a secondary winding of the transformer between the load and a node of the power supply which supplies the DC voltage and current superimposed with the intermediate ripple signal.

9. A power supply for supplying a direct current (DC) voltage and current to a load and for generating a reduced output ripple signal, the power supply comprising:
    a ripple sensing element for sensing one of the output ripple signal and an intermediate ripple signal to produce a control signal;
    a pulse width modulator coupled to the ripple sensing element for generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal; and
    a transformer coupled to the pulse width modulator for coupling the PWM signal into a portion of the power supply, the transformer arranged such that the PWM signal is combined with the intermediate ripple signal at an amplitude and relative phase sufficient to substantially reduce the output ripple signal.

10. The power supply of claim 9, wherein the ripple sensing element is arranged to sense a ripple voltage across the load.

11. The power supply of claim 9, wherein the ripple sensing element is arranged to sense a ripple voltage at a source of the intermediate ripple signal.

12. The power supply of claim 9, wherein the ripple sensing element is arranged to sense a signal proportional to a ripple current through the load.

13. The power supply of claim 9, further comprising a low-pass filter for filtering an output of the power supply to suppress the rectangular pulse carrier signal.

14. The power supply of claim 9, further comprising a push-pull switching amplifier for amplifying the PWM signal, and wherein the transformer comprises a center-tapped primary winding having opposing halves coupled to the push-pull switching amplifier.

15. The power supply of claim 9, further comprising a full-bridge switching amplifier for amplifying the PWM signal, and wherein the transformer comprises a primary winding coupled to the full-bridge switching amplifier.

16. The power supply of claim 9, wherein the power supply further comprises a node which supplies the DC voltage and current superimposed with the intermediate ripple signal, and wherein the transformer comprises a secondary winding coupled between the node and the load.

17. A radio communication transmitter, comprising:

a carrier generator for generating a radio frequency carrier;

a modulator coupled to the carrier generator for modulating the radio frequency carrier to produce a modulated carrier;

a power amplifier coupled to the modulator for amplifying the modulated carrier; and a power supply coupled to at least one of the carrier generator, the modulator, and the power amplifier for supplying a direct current (DC) voltage and current thereto, and for generating a reduced output ripple signal, the power supply comprising:

a ripple sensing element for sensing one of the output ripple signal and an intermediate ripple signal to produce a control signal;

a pulse width modulator coupled to the ripple sensing element for generating a rectangular pulse carrier signal having a duty cycle modulated with the control signal to produce a pulse width modulated (PWM) signal carrying ripple signal energy, wherein the rectangular pulse carrier signal operates at a frequency substantially higher than the control signal; and a transformer coupled to the pulse width modulator for coupling the PWM signal into a portion of the power supply, the transformer arranged such that the PWM signal is combined with the intermediate ripple signal at an amplitude and relative phase sufficient to substantially reduce the output ripple signal.

18. The radio communication transmitter of claim 17, wherein the ripple sensing element is arranged to sense a ripple voltage across an output of the power supply.

19. The radio communication transmitter of claim 17, wherein the ripple sensing element is arranged to sense a ripple voltage at a source of the intermediate ripple signal.

20. The radio communication transmitter of claim 17, wherein the ripple sensing element is arranged to sense a signal proportional to a ripple current delivered to an output of the power supply.

* * * * *